(12) United States Patent
Suzuki

(10) Patent No.: US 7,692,900 B2
(45) Date of Patent: Apr. 6, 2010

(54) HEAD STACK ASSEMBLY, AND STORAGE HAVING THE SAME

(75) Inventor: Yasuo Suzuki, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 643 days.

(21) Appl. No.: 11/647,000

(22) Filed: Dec. 28, 2006

(65) Prior Publication Data

US 2008/0055771 A1  Mar. 6, 2008

(30) Foreign Application Priority Data

Aug. 30, 2006  (JP) ............................. 2006-233663

(51) Int. Cl.
*G11B 5/54* (2006.01)

(52) U.S. Cl. .................................. 360/244.5

(58) Field of Classification Search ........................ None
See application file for complete search history.

(56) References Cited

U.S. PATENT DOCUMENTS

| 5,282,103 | A | * | 1/1994 | Hatch et al. ................. 360/245 |
| 5,491,597 | A | * | 2/1996 | Bennin et al. ............. 360/245.9 |
| 5,631,786 | A | * | 5/1997 | Erpelding ................. 360/97.01 |
| 5,668,684 | A | * | 9/1997 | Palmer et al. ............. 360/264.2 |
| 5,680,277 | A | * | 10/1997 | Bonn et al. ............... 360/264.2 |
| 5,708,541 | A | * | 1/1998 | Erpelding ................ 360/264.2 |
| 6,154,344 | A | * | 11/2000 | Marek ...................... 360/264.2 |
| 6,522,624 | B2 | * | 2/2003 | Budde ....................... 360/294.3 |
| 6,741,426 | B2 | * | 5/2004 | Girard ...................... 360/245.4 |
| 7,059,868 | B1 | * | 6/2006 | Yan ............................. 439/67 |
| 7,468,866 | B2 | * | 12/2008 | Yang et al. ............... 360/245.9 |
| 2002/0071218 | A1 | * | 6/2002 | Shiraishi et al. .......... 360/245.9 |

FOREIGN PATENT DOCUMENTS

| JP | 04-111217 | 4/1992 |
| JP | 04-144186 | 5/1992 |
| JP | 2003-59023 | 2/2003 |
| JP | 2003-152404 | 5/2003 |

* cited by examiner

*Primary Examiner*—Mark Blouin
(74) *Attorney, Agent, or Firm*—Greer, Burns & Crain, Ltd.

(57) ABSTRACT

A head stack assembly includes a suspension that supports a head that records information in or reproduces the information from a recording medium, a base plate that attaches the suspension to an arm that rotates the suspension, and a suspension substrate provided onto the suspension and electrically connected to the head, the suspension substrate having a long tail having a bending part near the base plate.

17 Claims, 8 Drawing Sheets

HEAD STACK ASSEMBLY, AND STORAGE HAVING THE SAME

This application claims the right of a foreign priority based on Japanese Patent Application No. 2006-23363, filed on Aug. 30, 2006, which is hereby incorporated by reference herein in its entirety as if fully set forth herein.

BACKGROUND OF THE INVENTION

The present invention relates generally to a storage, and more particularly to a suspension substrate mounted on a suspension, for example, in a hard disc drive ("HDD").

The HDD typically includes a disc, and a head stack assembly ("HSA") that supports a head and moves the head to a target position on the disc. The HSA includes a carriage (also referred to as an "actuator," an "E-block" due to its E-shaped section or "actuator ("AC") block"), a suspension attached to a support of the carriage (referred to as an "arm" hereinafter), and a magnetic head part supported on the suspension. The magnetic head part includes a fine head core (simply referred to as a "head" hereinafter) that records and reproduces a signal, and a slider that supports the head.

The suspension also serves as a flat spring that compresses the slider against the disc at a predetermined compression force. As the disc rotates, the airflow or air bearing occurs between the slider and the disc, floating the slider from the disc plane. The floating slider is spaced from the disc by a predetermined distance due to a balance between the floating force and the compression force. In this state, the arm rotates and moves the head to (seek for) a target position on the disc, for information reading and writing.

In order to meet the recent demand for the reduced cost and fast transfer, a long tail suspension is used, which extends a suspension substrate that is electrically connected to the head and provided on the surface of the suspension, whereby an end of the suspension substrate is directly connected to a main flexible printed circuit board ("FPC") fixed onto the carriage. The long tail suspension integrates a conventional trunk FPC that connects the main FPC to the suspension board, with a suspension substrate for impedance matching.

The suspension substrate that is a thin conductive connector plate extends from the magnetic head part along the centerline of the suspension in the longitudinal direction of the suspension, and then turns by 90° to the outside of the suspension. The suspension substrate is fixed onto the suspension. The end of the suspension board again turns by 90° on the side surface of the suspension to make a detour, and forms an aerial section located in air outside to the suspension and the arm. The aerial section extends along the contours of the suspension and the arm. In general, part of the suspension substrate from the aerial section to the main FPC is referred to as a long tail. The suspension substrate including the long tail has a wire pattern on a SUS substrate via an insulating layer. Next, the long tail is inserted into a slit that is formed in the side surface of the arm. Thereafter, the long tail is bent by 90°, and soldered to the main FPC.

Japanese Patent Application, Publication No. 4-111217 provides a bending part to part of the suspension substrate adhered to the suspension, and secures a bending action of the suspension as a flat spring without adhering the bending part (for example, FIG. 4). Japanese Patent Application, Publication No. 4-144186 proposes a slit in an FPC's bending part that connects a liquid crystal panel substrate to a control substrate.

Other prior art include Japanese Patent Applications, Publication Nos. 2003-152404 and 2003-59023.

A connection between the long tail and the main FPC requires an alignment between terminals at the long tail's tip and terminals of the main FPC. However, it is difficult to elongate or shrink the long tail along the longitudinal direction due to the rigidity of the SUS. In addition, while totally four terminals including a pair of terminals for recording and another pair of terminals for reproducing are conventionally necessary for one head, still another pair of terminals for floatation amount control have recently become necessary for precise control over the floatation amount of the slider. On the other hand, a size of a terminal part on which the terminals are formed is maintained due to the limitations from the standard. Therefore, both the long tail and the main FPC are required to squeeze six terminals in the terminal part that conventionally arranges four terminals, and a more precise alignment becomes necessary due to a reduced pitch between the terminals. It is difficult to manufacture an expandable and shrinkable long tail. When a tension applies between the long tail and the main FPC, and the long tail and/or the main FPC would suffer from a lowered characteristic, such as a disconnection.

BRIEF SUMMARY OF THE INVENTION

The present invention is directed to a HSA that is easy to manufacture and has an excellent electric characteristic, and a storage having the HSA.

A HSA according to one aspect of the present invention includes a suspension that supports a head that records information in or reproduces the information from a recording medium, a base plate that attaches the suspension to an arm that rotates the suspension, and a suspension substrate provided onto the suspension and electrically connected to the head, the suspension substrate having a long tail having a bending part near the base plate. This HSA has the bending part that enables the long tail to elongate and shrink in the longitudinal direction, facilitating, for example, an alignment and connection between the long tail of the suspension substrate and the main FPC. The number of bending parts is not limited. The long tail generally has a wire pattern on an approximately or substantially rigid substrate made, for example, of SUS via an insulating layer. The present invention is particularly effective to the long tail that cannot elongate or shrink due to substantial rigidity.

The bending part is preferably formed at an aerial section that exposes in air on a side of the arm. When the arm has a housing or slit that houses the long tail, a shape or size of the bending part can be restricted by a shape and size of the slit. As a result, the number of the bending parts increases, and it is difficult to house the long tail in the slit. Therefore, the bending part is preferably formed at the aerial section.

The bending part may have a convex that projects so that the convex has a height in a direction parallel to a rotating axis of the arm. When the bending part projects in the direction of the rotating axis of the arm, the long tail can elongate or shrink in its longitudinal direction. The long tail has a terminal part that is bent by about 90° around the longitudinal direction at the connecting part with the main FPC. When the bending direction is a rotating direction around the longitudinal direction, the long tail cannot elongate or shrink in the longitudinal direction.

The bending part may have a convex that projects towards the recording medium. In general, the long tail retreats and bends from the suspension substrate on the suspension in a direction separating from the disc. The long tail has a space in which it is bendable toward the disc, and the above configuration can maximizes the space. In this case, in order for the long tail to be inserted into the slit, the long tail is partially housed in a slit provided in a side surface of the arm, wherein when viewed from the side surface of the arm, the bending part is as high as a difference between a height of a surface of the suspension and a height of the long tail in the slit. The bending part is used both expansions and shrinkages of the long tail. In the shrinkage of the long tail, the height increases.

Therefore, the above limitation in height prevents a collision between the bending part and the disc.

Preferably, a pair of suspensions each of which supports the head are attached to the arm, a pair of bending parts formed on a pair of suspension substrates fixed onto the pair of suspensions having a pair of convexes projecting so that the convexes are separated from each other so as to avoid a collision. Preferably, the bending part has a perforation hole, because the perforation hole lowers the rigidity of the long tail and facilitates a formation of the bending part.

Preferably, the bending part includes a convex with an angle between 90° and 160° when viewed from a side surface of the arm. When the angle is smaller than 90°, a signal line in the long tail may disconnect. When the angle is greater than 160°, it is difficult to secure a length necessary to elongate the long tail. Preferably, a distance between a centerline of the arm and the bending part is between 0.2 mm and 0.6 mm, when viewed from a side surface of the arm. When the distance is smaller than 0.2 mm, a pair of long tails when provided on the arm may collide with each other. When the distance is greater than 0.6 mm, the bending part may collide with the disc.

For example, the suspension substrate has a terminal part connected to a main flexible printed circuit board provided onto the arm, each of the terminal part and the main flexible printed circuit board including a pair of terminals for recording, a pair of terminals for reproducing, and a pair of terminals for floatation amount control. The present invention is particularly effective, for example, when the number of terminals thus increases from conventional four to six, and highly precise alignment is required between the terminal part and the main FPC.

A storage according to another aspect of the present invention includes a suspension that supports a head that records information in or reproduces the information from a recording medium, a carriage that has an arm that supports said suspension, said carriage pivoting the suspension, a base plate that attaches said suspension to the arm, a main flexible printed circuit board provided on the carriage, and a suspension substrate provided onto said suspension and electrically connected to the head and said main flexible printed circuit board, said suspension substrate having a long tail having a bending part near a connection part between the arm and said base plate. This storage has the above HSA, and the bending part enables the long tail to elongate and shrink in the longitudinal direction, facilitating, for example, an alignment and connection between the long tail of the suspension substrate and the main FPC. Preferably, a distance between the bending part and the recording medium is between 0.3 mm and 0.8 mm when viewed from a side surface of the arm. When the distance is smaller than 0.3 mm, the disc may collide with the bending part. When the distance is greater than 0.8 mm, a pair of long tails when provided on the carriage may collide with each other.

A method according to another aspect of the present invention for manufacturing a head stack assembly that includes a suspension that supports a head that records information in and reproduces the information from a recording medium includes the steps of attaching, via a base plate, the suspension to an arm that pivots the suspension, and forming, before the attaching step, a bending part near a connection part between the arm and the base plate, on a long tail of a suspension board provided on the suspension, the long tail extending along a side of the arm. This manufacturing method forms the bending part before the suspension is attached, because it is difficult to insert a jig after the suspension is attached, in particular when there are plural suspensions. The forming step utilizes, for example, press work using a mold.

The manufacturing method may further include the step of forming the suspension, and the forming step may be performed after the suspension forming step. Alternatively, the manufacturing method may further include the steps of manufacturing a flexure that cantilevers the head, and assembling the flexure and a load beam connected to the base plate into the suspension, wherein the forming step is performed for the long tail of the suspension substrate fixed to the flexure before the assembling step after the manufacturing step.

The manufacturing method may further include the step of forming a perforation hole in part of the long tail at which the bending part is formed, before the bending part forming step. The perforation hole lowers the rigidity of the long tail and facilitates a formation of the bending part. In this case, the perforation hole forming step may use photo-etching.

Other objects and further features of the present invention will become readily apparent from the following description of the preferred embodiments with reference to accompanying drawings.

DETAILED DESCRIPTION OF THE PREFERRED EMBODIMENTS

Figure 1:
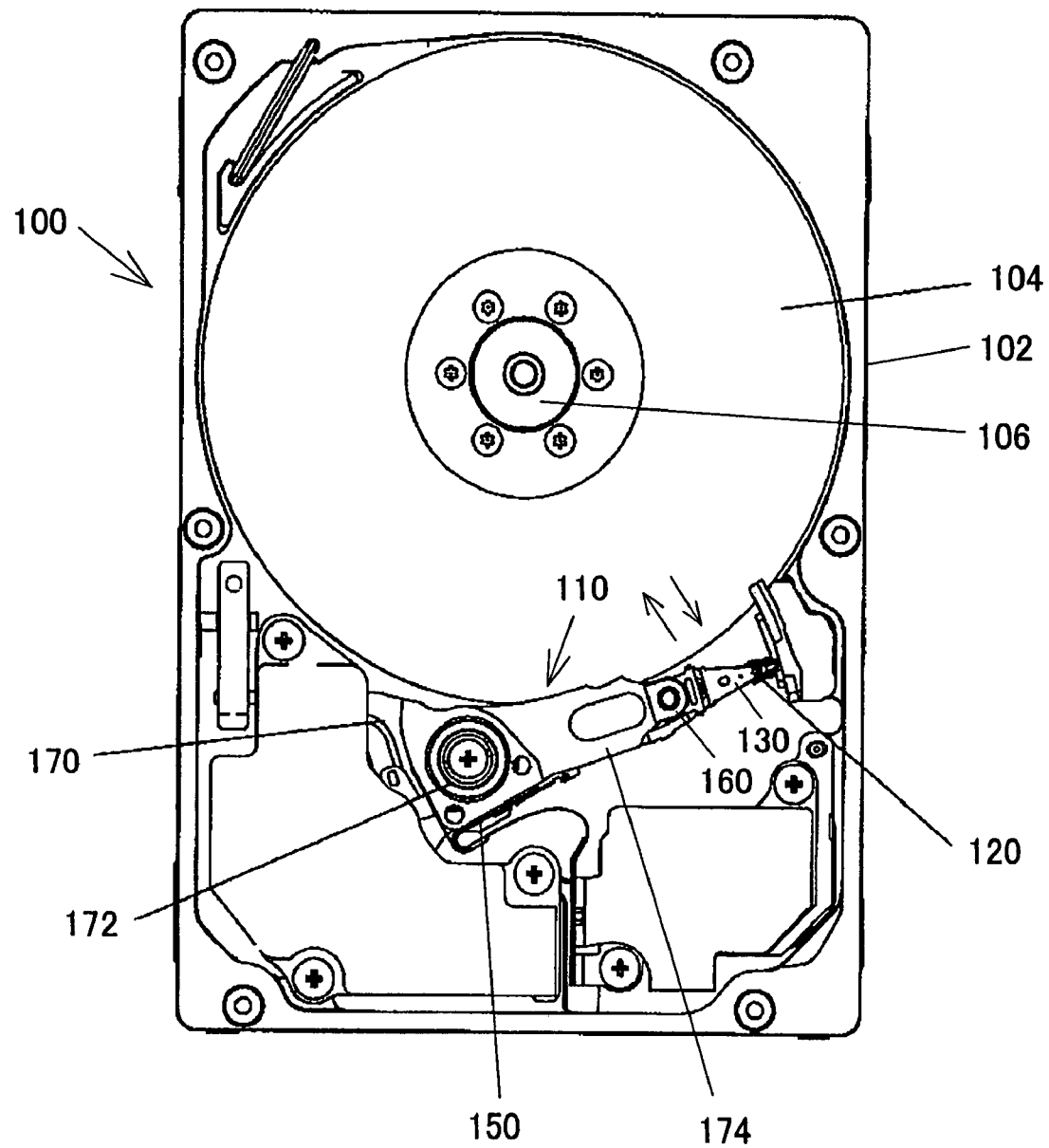
FIG. 1 is an internal structure of a hard disc drive ("HDD") according to one embodiment of the present invention.

Referring now to the accompanying drawings, a description will be given of a HDD 100 according to one embodiment of the present invention. The HDD 100 includes, as shown in FIG. 1, one or more magnetic discs 104 each serving as a recording medium, a spindle motor 106, and a head stack assembly ("HSA") 110 in a housing 102. Here, FIG. 1 is a schematic plane view of the internal structure of the HDD 100.

The housing 102 is made, for example, of aluminum die cast base and stainless steel, and has a rectangular parallelepiped shape to which a cover (not shown) that seals the internal space is jointed. The magnetic disc 104 has a high surface recording density, such as 100 $Gb/in^2$ or greater, and mounted on a spindle of the spindle motor 106 through its center hole.

The spindle motor 106 has, for example, a brushless DC motor (not shown) and the spindle as its rotor part. For instance, two discs 104 are used in order of the disc, a spacer, the disc and a clamp ring stacked on the spindle, and fixed by bolts coupled with the spindle.

The HSA 110 includes a suspension 130 that supports a magnetic head part 120, a base plate 160, and a carriage 170.

The magnetic head 120 includes a slider 121, and a head device built-in film 123 that is jointed with an air outflow end of the slider 121 and has a read/write head 122.

Figure 2:
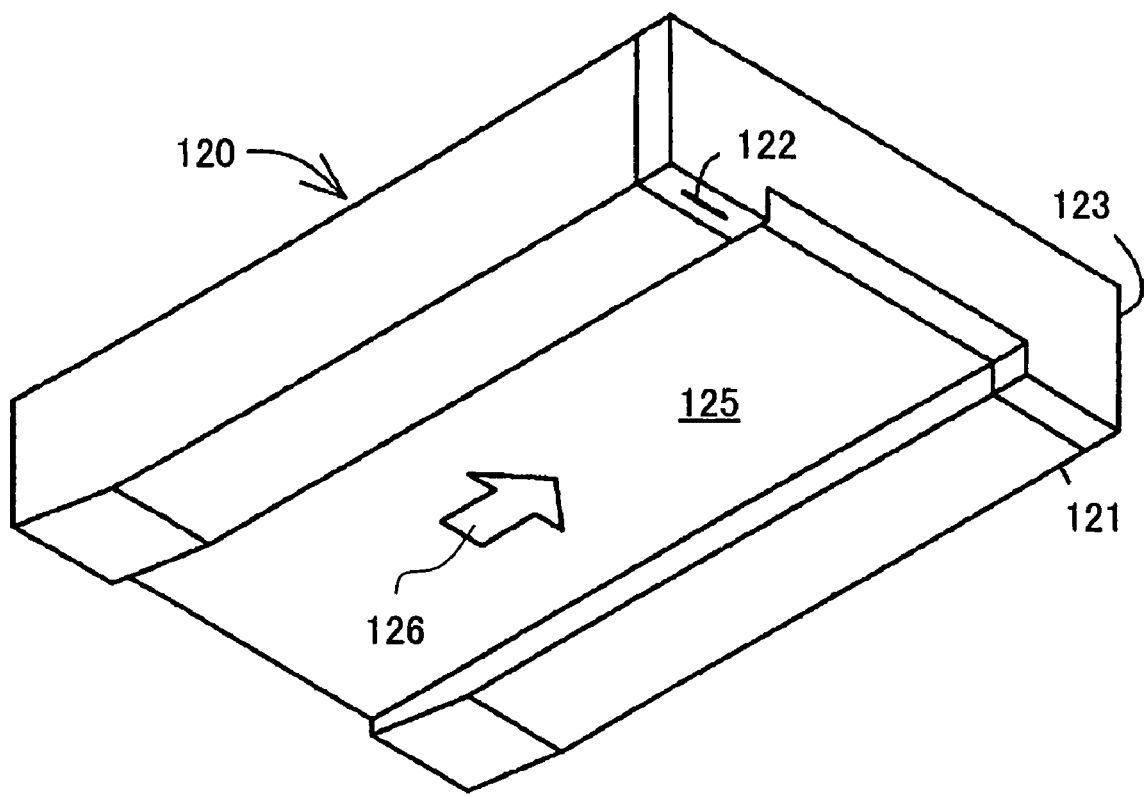
FIG. 2 is an enlarged perspective view of a magnetic head part in the HDD shown in FIG. 1.

The slider 121 has an approximately rectangular parallelepiped shape, and is made of $Al_2O_3$—TiC (Altic). The slider 121 supports the head 122, and floats above the surface of the rotating disc 104. A plane of the slider 121 opposing a surface of the magnetic disc 104 serves as a floating surface 125. The floating surface 125 receives an airflow 126 that occurs with rotations of the magnetic disc 104. FIG. 2 is an enlarged perspective view of the magnetic head part 120.

The head 122 is an MR inductive composite head that includes an inductive head device that writes binary information in the magnetic disc 104 utilizing the magnetic field generated by a conductive coil pattern (not shown), and a magnetoresistive ("MR") head that reads the binary information based on the resistance that varies in accordance with the magnetic field applied by the magnetic disc 104.

The suspension 130 serves to support the magnetic head part 120 and to apply an elastic force to the magnetic head part 120 against the disc 104 and is, for example, a Watlas-type stainless-steel suspension. The suspension 130 has a flexure 134 that cantilevers the magnetic head part 120, and a load beam 136 (also referred to as a hinge plate or another name) connected to the base plate 160. The load beam 136 has a spring part at its center so as to apply a sufficient compression force in a Z direction. The load beam 136 has a rigid part at its proximal end, a spring part at its center, and a rigid part at its distal end. The load beam 136 contacts the flexure 134 via a projection called a dimple (referred to as a pivot or another name) so that the floating surface 125 can follow the disc's warp and swell and it is always parallel to the disc plane. The magnetic head part 120 is designed to softly pitch and roll around the dimple.

Figures 3A, 3B:
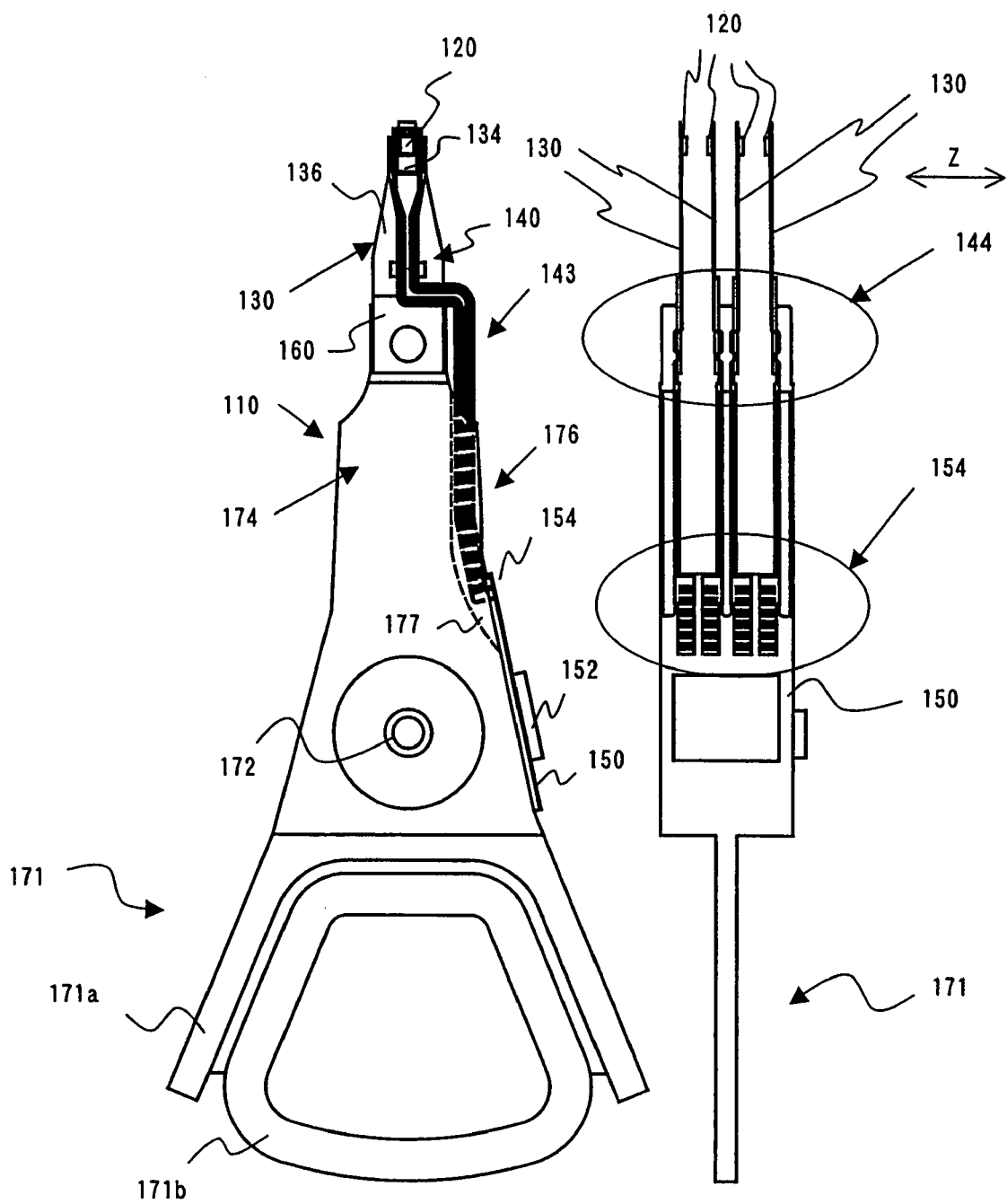
FIGS. 3A and 3B are schematic plane and side views of a HAS shown in FIG. 1.
Figures 4A, 4B:
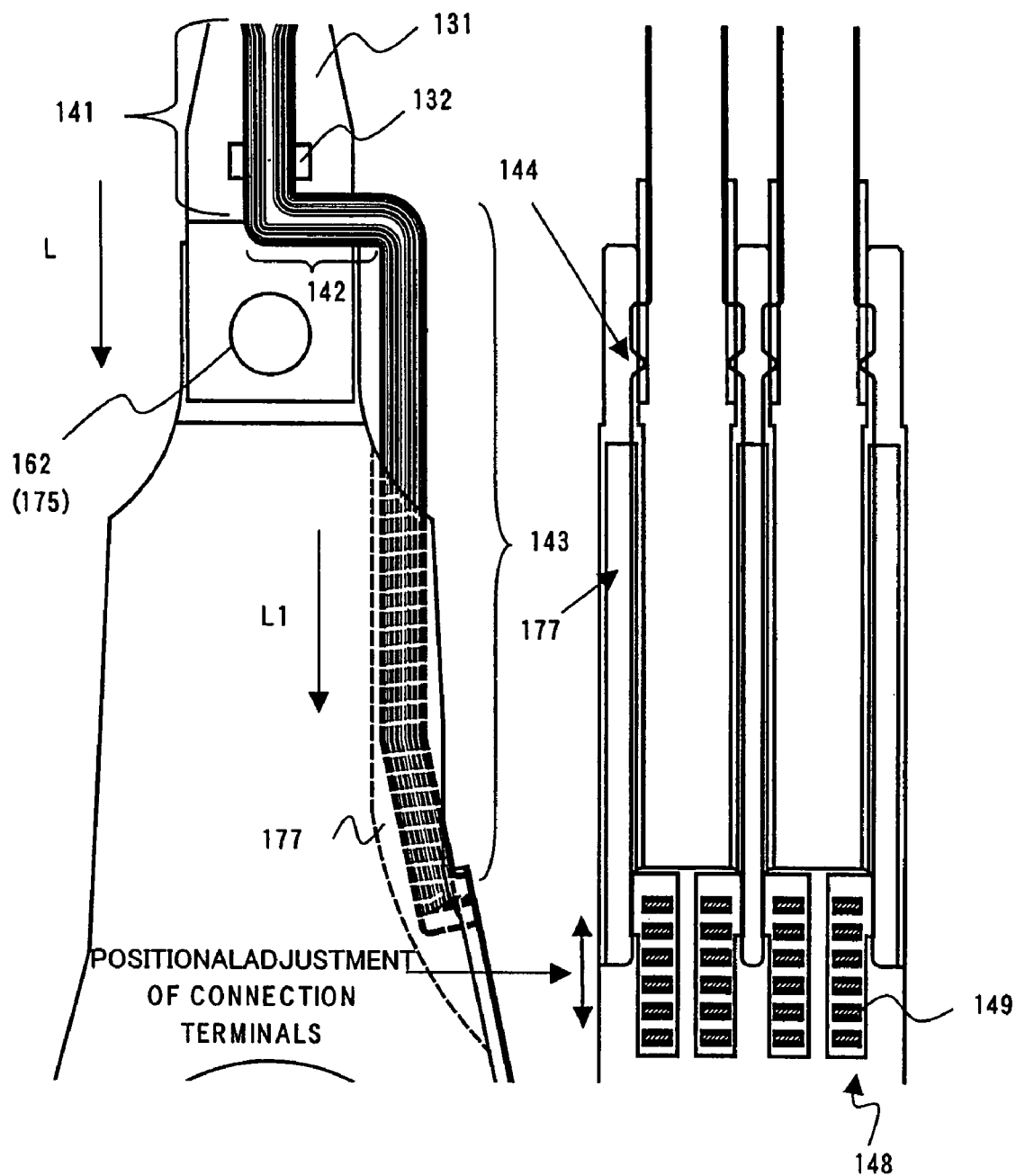
FIG. 4A is a partially enlarged plane view of FIG. 3A.
FIG. 4B is a partially enlarged plane view of FIG. 3B.
Figures 5A, 5B:
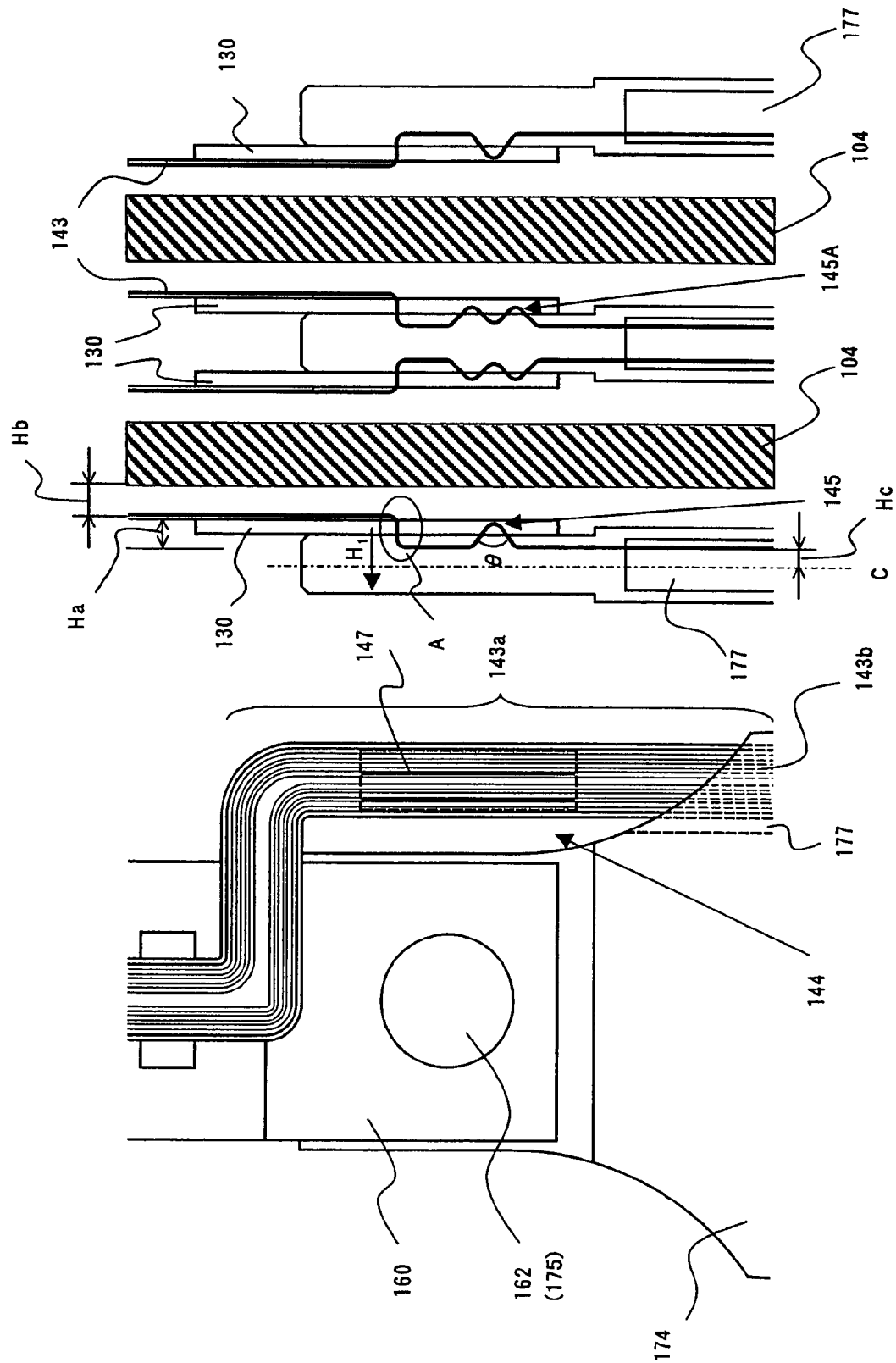
FIG. 5A is a partially enlarged plane view of FIG. 4A.
FIG. 5B is a partially enlarged side view of FIG. 4B.

The suspension 130 is mounted with a suspension substrate 140 that is electrically connected to the magnetic head part 120, as shown in FIGS. 3A to 5B. Here, FIGS. 3A and 3B are schematic plane and side views of the HSA 110. FIG. 4A is a partially enlarged plane view of FIG. 3A, and FIG. 4B is a partially enlarged plane view of FIG. 3B. FIG. 5A is a partially enlarged plane view of FIG. 4A, and FIG. 5B is a partially enlarged side view of FIG. 4B.

The suspension substrate 140 is electrically connected to the head 122 and the main FPC 150, and sends the sense current, write information, and read information. The suspension substrate 140 is welded with or fixed onto the suspension 130 at a welding part 132 on a surface 131 onto which the magnetic head part 120 is mounted.

The suspension 140 includes a base 141, a turning part 142, a long tail 143, and a terminal part 148 at the tip of the long tail 143. This embodiment provides the suspension substrate 140 with the turning part 142, but the turning part 142 is not necessary when the base 141 extends along one side surface of the suspension 130.

One end of the base 141 is a wiring part (not shown) connected to the magnetic head part 120, and the other end of the base 141 is located near the boundary between the suspension 130 and the base plate 160. The base 141 extends from the magnetic head part 120 along the centerline of the suspension 130 on the surface 131 in a longitudinal direction L. The longitudinal direction L is parallel to a line that connects the center of the shaft 172 to the center of the perforation hole 175 of the arm 174 or the center of the boss 162 of the base plate 160.

The turning part 142 turns by 90° from the end of the base 141 to the outside of the arm 174, i.e., in a horizontal direction H perpendicular to the longitudinal direction L. The other end of the turning part 142 turns by about 90° on a side surface 176 of the arm 174.

The long tail 143 starts from the other end of the turning part 142, and ends at the connection part with the main FPC 150 or the terminal part 148, extending along the side surface 176 of the arm 174. The long tail 143 has an aerial section 143a and a housed section 143b. The aerial section 143a exposes in air next to the side surface 176 of the arm 174, as shown in FIG. 5A. The housed section 143b is part housed in a slit 177 formed in the arm 174. The suspension substrate 143 that includes the long tail 143 is provided with a wiring pattern on a substrate via an insulating layer, such as polyimide. The substrate is made, for example, of SUS, and its rigidity is high or it is substantially rigid. A bending part 144, which will be described later, is particularly useful for the long tail 143 that is too rigid to elongate or shrink.

The terminal part 148 is provided at the end of the long tail 143, and soldered with the main FPC 150 after bent by 90° around the longitudinal direction of the long tail 143. The terminal part 148 has totally six terminals 149 for the head 122 as shown in FIG. 4B, i.e., two terminals for recording, two terminals for reproducing, and two terminals for floatation amount control. The bending part 144 of this embodiment is useful for an environment where the number of terminals increases from conventional four to six, and highly precise alignment is required between the terminal part 148 and the main FPC 150.

The long tail 143 has a bending part 144 near a connection part between the arm 174 and the base plate 160. The connection part between the arm 174 and the base plate 160 is a swaging part between the boss 162 of the base plate 160 and the perforation hole 175 in the arm 174. The bending part 144 enables the long tail 143 to adjust its length or to elongate or shrink in the longitudinal direction L1 along the side surface 176 of the arm 174, facilitating the alignment and connection between the terminal part 148 and the main FPC 150. The number of bending parts 148 is not limited. For example, as shown in FIG. 5B, a pair of outermost long tails 143 have the bending part 144 having one convex 145, and a pair of inner long tails 143 have the bending part 144 having two convexes 145A.

The bending part 144 is formed at the aerial section 143a, as shown in FIG. 5A. In FIG. 5A, the aerial section 143a has a length of about 4.4 mm. The arm 174 has a housing or slit 177 that partially houses the long tail 143. When the long tail 143 has the bending part 144 in the slit 177, a shape or size of the bending part 144 is restricted by a shape and size of the slit 177. As a result, the number of the bending parts 144 increases so as to secure the predetermined extended length, or it is difficult to house the long tail 143 in the slit 177. Therefore, the bending part 144 is formed at the aerial section 143a.

The convexes 145 and/or 145A project perpendicular to the paper plane shown in FIG. 5A that is a plane perpendicular to the center axis of the shaft 172 as the rotating shaft of the arm 174 or that is a plane parallel to the surface of the disc 104. The long tail 143 can elongate and shrink in the longitudinal direction when the bending part 144 can vary the height in the direction of the center axis of the shaft 172 that serves as the rotating shaft of the arm 174. The terminal part 148 is bent by about 90° around the longitudinal direction of the long tail 143. The bending direction is important because the bending direction that is the rotating direction around the longitudinal direction of the long tail 143 does not enable the long tail 143 to elongate or shrink in its longitudinal direction.

The convexes 145 and/or 145A project toward the disc 104. For example, the leftmost long tail 143 shown in FIG. 5B bends and retreats at A part in a direction $H_1$ separating from the disc 104 from the suspension substrate 140. The base 141 is located on the surface 131 of the suspension 130, whereas the long tail 143 is inserted into the slit 177 in the side surface 176 of the arm 174, and the surface 131 is not level with the slit 177. In the range of a difference Ha between the height of the base 141 of the suspension substrate 140 and the height of the long tail 143, the long tail 143 has a space in which the long tail 143 can bend, and this embodiment effectively utilizes this space. The convex 145 has a height smaller than Ha.

When the bending part 144 is used to shrink the long tail 143, the height of the bending part 144 increases. The above limitation can avoid a collision between the disc 104 and the bending part 144 in that case.

When a pair of suspensions 130 is attached to the carriage 170 as shown in FIG. 5B, the convexes 145A of the bending parts 144 of the suspension substrates 140 fixed onto the center suspensions 130 project in such directions that the convexes 145A separate from each other. This is because they would collide with each other if they project in such directions that the convexes 145A approach each other.

The convex 145 has an angle θ between 90° and 160° when viewed from a plane shown in FIG. 5B perpendicular to the paper plane shown in FIG. 5A that is a plane parallel to the surface of the disc 104 or the surface perpendicular to the center axis of the shaft 172 that serves as the rotating shaft of the arm 174. The plane shown in FIG. 5B is the side surface 176 of the arm 174 or the plane containing the center axis of the shaft 172 that serves as the rotating shaft of the arm 174. When the angle θ is smaller than 90°, a signal line in the long tail 143 may disconnect. When the angle θ is greater than 160°, it is difficult to secure an extension length necessary for the long tail 143.

In the paper plane shown in FIG. 5B, a distance Hb between the long tail 143 or the convex 145 and the disc 104 is maintained between 0.3 mm and 0.8 mm. When the distance Hb is smaller than 0.3 mm, the disc 104 may collide with the long tail 143 or the bending part 144. When the distance Hb is greater than 0.8 mm, a pair of center long tails 143 shown in FIG. 5B may collide with each other.

A distance Hc between the long tail 143 or the bending part 144 and a centerline C of the arm 174 shown by an alternate long and short dash line in the direction perpendicular to the paper plane shown in FIG. 5B is maintained between 0.2 mm and 0.6 mm. When the distance Hc is smaller than 0.2 mm, a pair of center long tails 143 shown in FIG. 5B may collide with each other. When the distance Hc is greater than 0.6 mm, the bending part 144 may collide with the disc 104.

The bending part 144 preferably has a perforation hole 147, as shown in FIG. 5A. The perforation hole 147 lowers the rigidity of the long tail 143, and facilitates a formation of the bending part 144.

Figure 6:
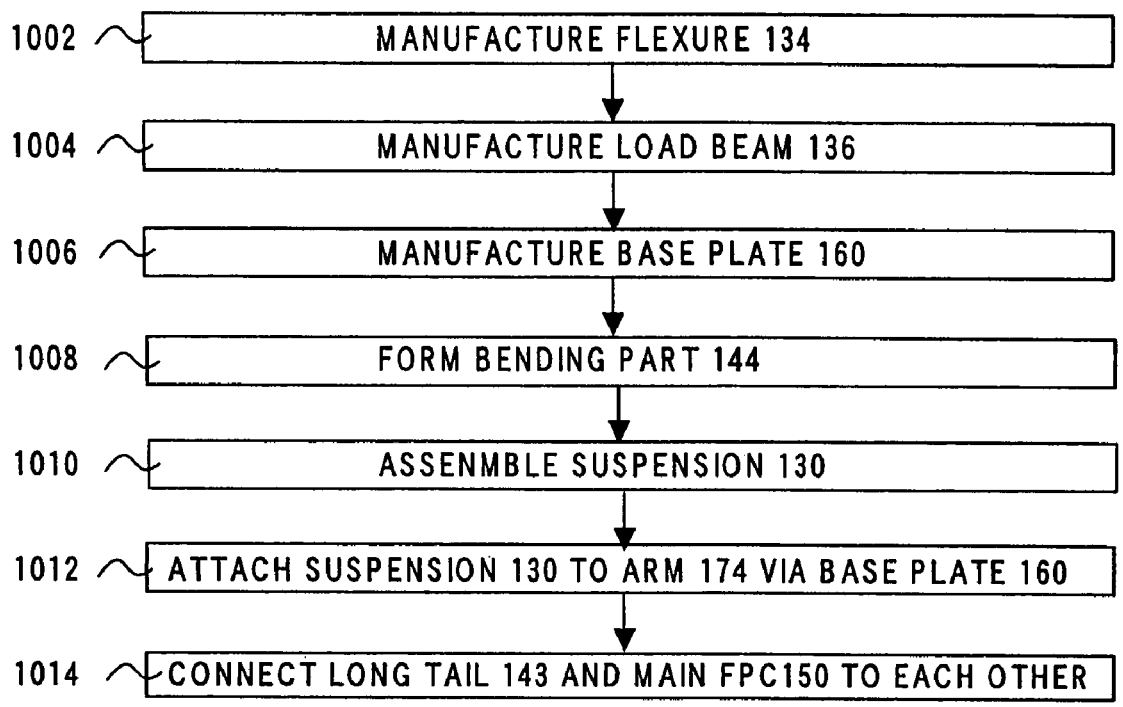
FIG. 6 is a flowchart for explaining a forming method of a bending part shown in FIG. 5B.

Referring now to FIG. 6, a description will be given of a formation method of the bending part 144. Here, FIG. 6 is a flowchart for explaining the formation method of the bending part 144. First, the flexure 134 is manufactured (step 1002). Next, the load beam 136 is manufactured (step 1004). Next, the base plate 160 is manufactured (step 1006). The order of the steps 1002 to 1006 is arbitrary.

In part of the long tail 143 at which the bending part 144 is formed, the perforation hole 147 is formed in the flexure 134 manufacturing step 1002. As described above, the perforation hole 147 lowers the rigidity of the long tail 143, and facilitates a formation of the bending part 144. In that case, the perforation hole 147 is formed, for example, by using the photo-etching.

Figure 7:
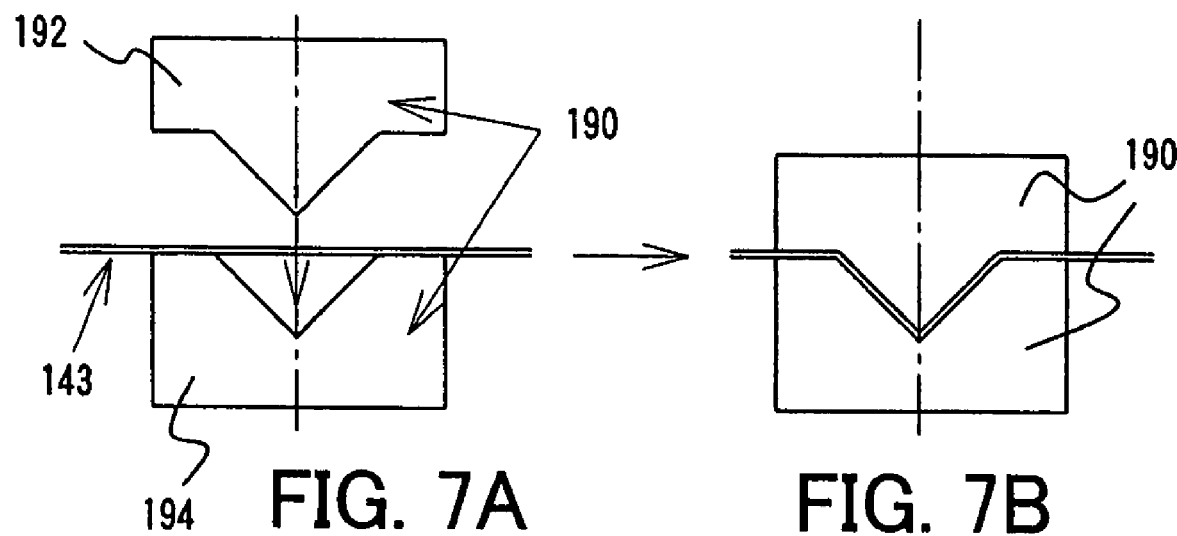
FIGS. 7A and 7B are schematic sectional views of a mold that illustratively realizes the step 1008 shown in FIG. 6.

Next, the bending part 144 is formed (step 1008). The bending part 144 is made, for example, by the press work using a mold 190 as shown in FIGS. 7A and 7B. Here, FIG. 7A shows the mold 190 before the press work, and FIG. 7B shows the mold 190 during the press work. The mold 190 includes an upper mold 192 having a sectionally convex shape, and a lower mold 194 having a sectionally concave shape. The long tail 143 is arranged and clamped between the upper mold 192 and the lower mold 194 so as to form the bending part 144 on the long tail 143. FIGS. 7A and 7B show the mold 190 used to form only one convex 145. A view that shows a mold that can form two or more convexes 145A is omitted.

Next, the flexure 134, the load beam 136, and the base plate 160 are assembled into the suspension 130 (step 1010). Thereafter, the suspension 130 is electrically connected to the magnetic head part 120. Next, the suspension 130 is attached to the arm 174 via the base plate 160 (step 1012).

Next, the long tail 143 is inserted into the slit 177 in the arm 174, and the terminal part 148 at the tip is connected to the main FPC 150 (step 1014). If the long tail 143 should be elongated in the alignment between the terminal part 148 and the terminal part 154 of the main FPC 150, the bending angle of the bending part 144 is made wider up to 180°. On the other hand, if the long tail 143 should be shrunk in the alignment between the terminal part 148 and the terminal part 154 of the main FPC 150, the bending angle of the bending part 144 is made sharper.

The manufacturing method shown in FIG. 6 executes the step 1008 before the step 1012, because it is difficult to insert the long tail 143 into the mold 190 after the suspension 130 is attached. Thereby, the manufacture of the HSA 110 becomes easier.

Figure 8:
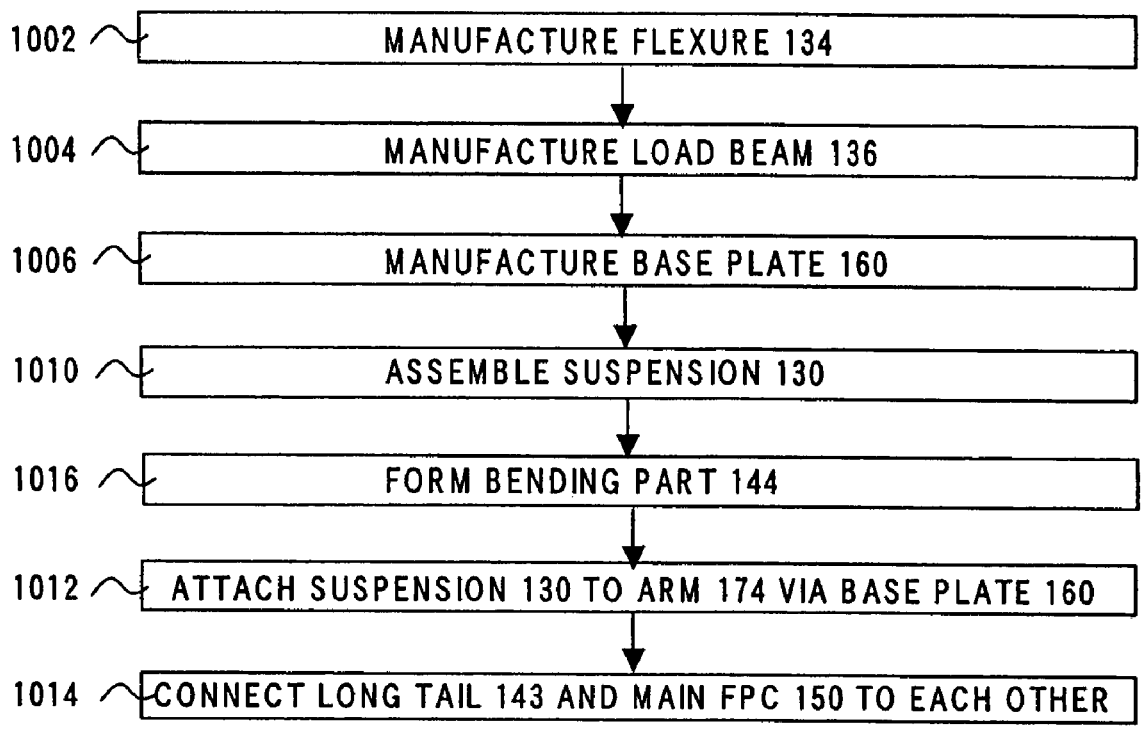
FIG. 8 is a variation of the flowchart shown in FIG. 6.

Referring now to FIG. 8, a description will be given of a variation of the flowchart shown in FIG. 6. FIG. 8 is a flowchart as a variation of the manufacturing method shown in FIG. 6. Those steps in FIG. 8, which are the corresponding steps in FIG. 6, are designated by the same reference numerals, and a detailed description will be omitted. Instead of the step 1008 shown in FIG. 6, FIG. 8 provides the step 1016 of forming the bending part 144 similar to the step 1008 between the step 1010 and the step 1012.

The manufacturing method shown in FIG. 8 also executes the step 1016 before the step 1012, because it is difficult to insert the long tail 143 into the mold 190 after the suspension 130 is attached. Thereby, the manufacture of the HSA 110 becomes easier.

The main FPC 150 has the terminal part 154 connectable to the terminal part 148, which is located at the back of the terminal part 146 shown in FIG. 3B. The main FPC 150 supplies the suspension substrate 140 with a control signal, a signal to be recorded in the disc 104, and the power, and receives a signal reproduced from the disc 104. The main FPC 150 has a pre-amplifier IC 152, and amplifies various signals. The terminal part 154 of the main FPC 150 is configured similar to the terminal part 148 shown in FIG. 4B. The bending part 144 is particularly useful for the environment where the number of terminals thus increases from conventional four to six, and highly precise alignment is required between the terminal part 148 and the main FPC 150.

The base plate 160 serves to attach the suspension 130 to the arm 174, and includes a welded section, and a boss 162. The welded portion is to be laser-welded with the suspension 130. The boss 162 is a projection perpendicular to the paper plane shown in FIG. 4A, and swaged with the arm 144.

The carriage 170 rotates or swings the magnetic head part 120 in an arrow direction in FIG. 1, and includes a voice coil motor 171, the shaft 172, and the arm 174.

The voice coil motor 171 has a flat coil 171b between a pair of yokes 171a. The flat coil 171b opposes to a magnetic circuit (not shown) provided to the housing 102, and the carriage 170 swings around the shaft 172 in accordance with values of the current that flows through the flat coil 171b. The magnetic circuit includes, for example, a permanent magnet fixed onto an iron plate fixed in the housing 102, and a movable magnet fixed onto the carriage 170.

The shaft 172 is inserted into a hollow cylinder in the carriage 170, and extends perpendicular to the paper surface of FIG. 1 in the housing 102. The center axis of the shaft 172 is a rotating axis of the arm 174.

The arm 174 is an aluminum rigid member, and has a perforation hole 175 at its tip. The slit 177 is provided in the side surface 176 of the arm 174, and partially houses the long tail 143. The suspension 130 is attached to the arm 174 via the perforation hole 175 and the base plate 160.

Further, the present invention is not limited to these preferred embodiments, and various modifications and variations may be made without departing from the spirit and scope of the present invention. While this embodiment discusses the HDD, the present invention is applicable to another type of magnetic disc drive, such as a magneto optic disc drive.

What is claimed is:

1. A head stack assembly comprising:
   a suspension that supports a head that records information in or reproduces the information from a recording medium;
   a carriage that has an arm that supports said suspension, said carriage being configured to pivot the suspension;
   a base plate that attaches said suspension to the arm;
   a suspension substrate provided onto said suspension and electrically connected to the head, said suspension substrate having a long tail including a terminal part and a bending part near said base plate; and
   a main flexible printed circuit board fixed onto the carriage,
   wherein a length of the suspension substrate is adjustable in a longitudinal direction through changing an angle of the bending part.

2. A head stack assembly according to claim 1, wherein the bending part is formed at an aerial section that exposes in air on a side of the arm.

3. A head stack assembly according to claim 1, wherein the bending part has a convex that projects so that the convex has a height in a direction parallel to a rotating axis of the arm.

4. A head stack assembly according to claim 1, wherein the bending part has a convex that projects towards the recording medium.

5. A head stack assembly according to claim 4, wherein the long tail is partially housed in a slit provided in a side surface of the arm,
   wherein when viewed from the side surface of the arm, the bending part is as high as a difference between a height of a surface of the suspension and a height of the long tail in the slit.

6. A head stack assembly according to claim 1, wherein a pair of suspensions each of which supports the head are attached to the arm, a pair of bending parts formed on a pair of suspension substrates fixed onto the pair of suspensions having a pair of convexes projecting so that the convexes are separated from each other.

7. A head stack assembly according to claim 1, wherein the bending part has a perforation hole.

8. A head stack assembly according to claim 1, wherein the long tail of the suspension substrate is substantially rigid in the longitudinal direction.

9. A head stack assembly according to claim 1, wherein the bending part includes a convex with an angle between 90° and 160° when viewed from a side surface of the arm.

10. A head stack assembly according to claim 1, wherein a distance between a centerline of the arm and the bending part is between 0.2 mm and 0.6 mm, when viewed from a side surface of the arm.

11. A head stack assembly according to claim 1, wherein each of the long tail and the main flexible printed circuit board including a pair of terminals for recording, a pair of terminals for reproducing, and a pair of terminals for floatation amount control of a slider that includes the head above the recording medium.

12. A storage comprising:
    a suspension that supports a head that records information in or reproduces the information from a recording medium;
    a carriage that has an arm that supports said suspension, said carriage being configured to pivot the suspension;
    a base plate that attaches said suspension to the arm;
    a main flexible printed circuit board provided on the carriage; and
    a suspension substrate provided onto said suspension and electrically connected to the head and said main flexible printed circuit board, said suspension substrate having a long tail including a terminal part and a bending part near a connection part between the arm and said base plate,
    wherein a length of the suspension substrate is adjustable in a longitudinal direction through changing an angle of the bending part of the long tail of the suspension substrate.

13. A storage according to claim 12, wherein a distance between the bending part and the recording medium is between 0.3 mm and 0.8 mm when viewed from a side surface of the arm.

14. A method for manufacturing a head stack assembly that includes a suspension that supports a head that records information in and reproduces the information from a recording medium, and a main flexible printed circuit board fixed onto a carriage configured to pivot the suspension and including a terminal part, said method comprising the steps of:
    attaching, via a base plate, the suspension to an arm that pivots the suspension; and
    forming, before said attaching step, a bending part near a connection part between the arm and the base plate, on a long tail of a suspension substrate provided on the suspension, the long tail extending along a side of the arm, the long tail of the suspension substrate including a terminal part; and
    connecting the terminal part of the long tail of the suspension substrate to the terminal part of the main flexible printed circuit board,
    wherein said connecting step includes the step of aligning the terminal part of the long tail of the suspension substrate with the terminal part of the main flexible printed circuit board by adjusting a length of the suspension substrate in a longitudinal direction through changing an angle of the bending part of the long tail of the suspension substrate.

15. A method according to claim 14, wherein said forming step utilizes press work using a mold.

16. A method according to claim 14, further comprising the step of forming the suspension, said forming step being performed after said suspension forming step.

17. A method according to claim 14, further comprising the steps of:
    manufacturing a flexure that cantilevers the head; and
    assembling the flexure and a load beam connected to the base plate into the suspension, wherein said forming step is performed for the long tail of the suspension substrate fixed to the flexure before the assembling step after the manufacturing step.

* * * * *